June 15, 1926.

E. M. BAILEY 1,589,089

HEADLIGHT CONTROLLING DEVICE

Filed July 15, 1925   2 Sheets-Sheet 1

Ernest M. Bailey,
INVENTOR

BY Victor J. Evans
ATTORNEY

P. E. Hickey.
WITNESS:

June 15, 1926.
E. M. BAILEY
1,589,089
HEADLIGHT CONTROLLING DEVICE
Filed July 15, 1925        2 Sheets-Sheet 2
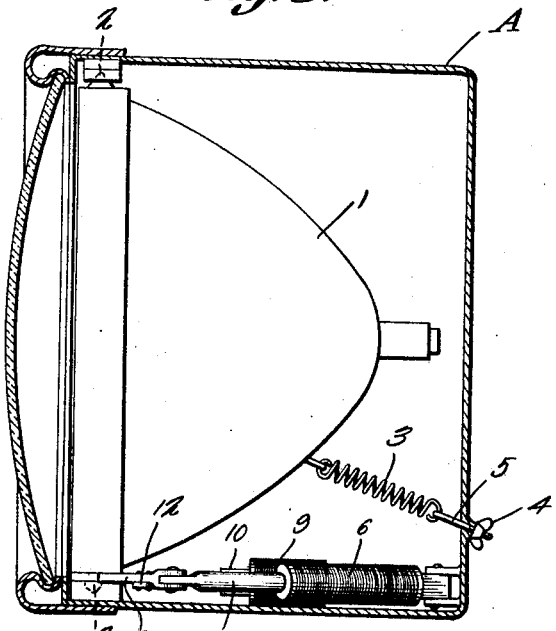
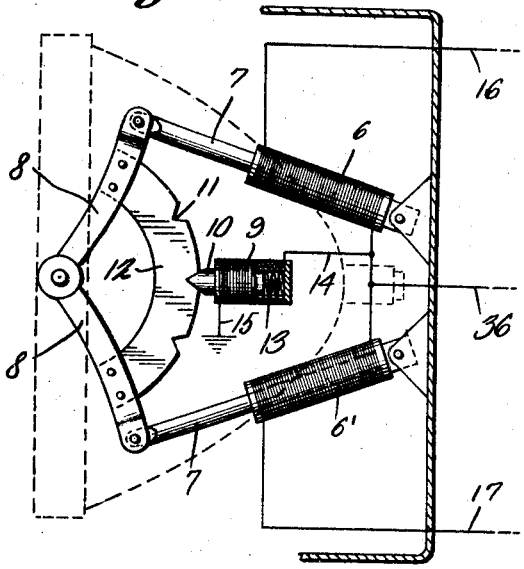
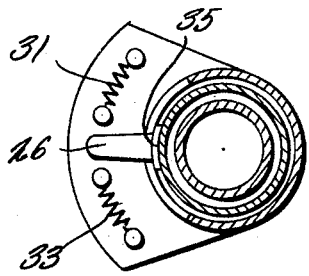
*Ernest M. Bailey,*
INVENTOR
BY *Victor J. Evans*
ATTORNEY Patented June 15, 1926.

1,589,089

UNITED STATES PATENT OFFICE.

ERNEST M. BAILEY, OF WOODSDALE, NORTH CAROLINA.

HEADLIGHT-CONTROLLING DEVICE.

Application filed July 15, 1925. Serial No. 43,818.

This invention relates to means for turning the reflectors of headlamps of motor vehicles and the like about their vertical axis so as to prevent blinding of pedestrians and drivers of vehicles approaching the vehicle provided with the invention and for illuminating the side of the road while passing other vehicles.

Another object of the invention is to provide means for causing the rays of light from the lamps to follow the road on curves as well as straight portions.

The present invention is an improvement upon that forming the subject matter of Patent 1,547,490, granted me on July 28, 1925.

An object of the present invention is to provide locking means for holding the reflectors in their adjusted positions so that it is not necessary to use current to hold the reflectors in their adjusted positions.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a vertical sectional view through one of the lamps.

Figure 4 is a horizontal sectional view through Figure 3.

Figure 5 is a sectional detail view showing the switch means on the steering post.

Figure 1:
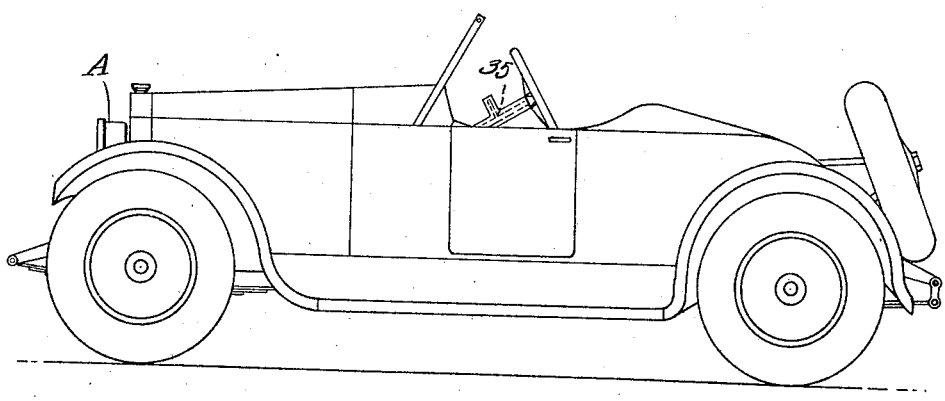
Figure 1 is a view of an automobile equipped with my invention.
Figure 2:
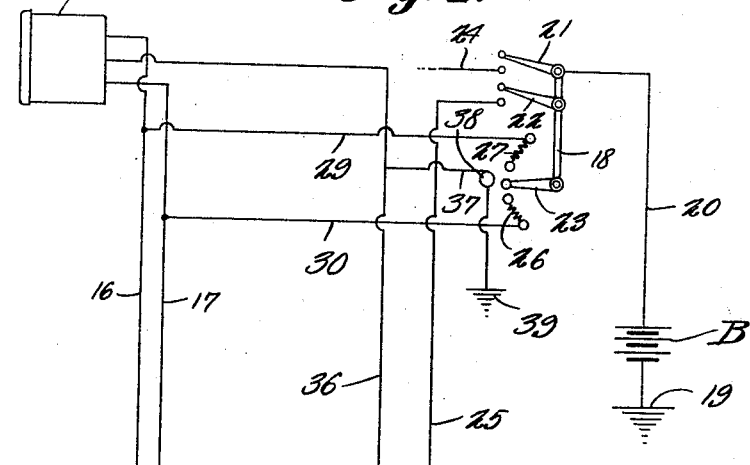
Figure 2 is a diagrammatic view of the invention.
Figure 2:
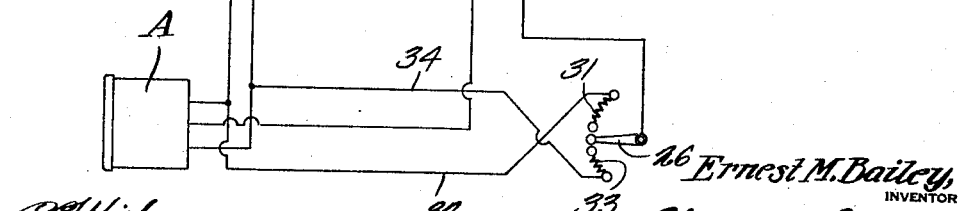

In these views, 1 indicates the reflector of each headlamp A, this reflector being pivotally supported in the lamp casing at diametrically opposite points, as shown at 2, so that the reflector can turn about its vertical axis. Each reflector is held in a central or neutral position by means of the coiled spring 3 which is adjustable through means of the winged nut 4 on the threaded part 5 which is connected with the spring. The reflector is turned by means of the two solenoids 6 and 6' which are attached to a part of the lamp casing and which have their cores 7 pivoted to the arms 8 which are fastened to the bottom of the front part of the reflector. Thus when the solenoid 6 is energized, its core will move inwardly and exert a pull upon the arm 8 so as to turn the reflector to the right and when the solenoid 6' is energized, its core will turn the reflector to the left. A small solenoid 9 has its core 10 provided with a beveled end for engaging any one of three notches 11 formed in an arc-shaped plate 12 which is fastened to the arms 8. A spring 13 holds the core 10 in projected position and by engaging the proper notch in the plate, said core acts to lock the reflector in either of its adjusted positions or in its neutral or central position. The solenoid is connected by the conductors 14 with the windings of the solenoids 6 and 6' and said solenoid 9 is grounded, as at 15. The solenoids 6 of the two lamps are connected together by the conductors 16 and the solenoids 6' are connected together by the conductors 17. A switch 18 is connected to a battery B, which is grounded at 19, by a conductor 20 and this switch includes the levers 21, 22 and 23. The lever 21 controls the circuit 24 to the bulbs of the lamps, and the lever 22 controls the circuit 25 of a rheostat switch 26, to be hereinafter described. The lever 23 forms part of a rheostat switch which includes the coils 27 and 28, the former being connected by the conductor 29 with the conductors 16 and the latter being connected with the conductors 17 by the conductor 30. The coil 31 of switch 26 is connected by a conductor 32 with conductors 16 and coil 33 of said switch is connected by conductor 34 with the conductors 17. This switch has its lever or arm connected with the steering post, as shown at 35 in Figures 1 and 5, so that the lever will move with the post and thus the switch will be automatically operated when the steering mechanism of the vehicle is actuated. Conductors 36 connect the ground wires 14 of the two sets of solenoids together, and these conductors 36 are connected by a conductor 37 with a switch 38 which is grounded at 39.

From the foregoing, it will be seen that by closing the switch 21, the lamps will be lighted and by moving the switch 23 to the right, current will flow from the battery into the right hand solenoids 6 so that the two reflectors of the lamps will be turned to the right. This passage of the current will also energize the solenoids 9 so that the latching cores 10 will be retracted. The extent of movement of the reflectors will be governed according to the distance the lever 23 is moved over the coil 27. By moving the lever 23 over the coil 26, the left hand solenoids 6' will be energized, which will cause the reflectors to be swung to the left. If the lamps are to remain with their reflectors turned to either the right or left for some time, the switch 38 is depressed so as to ground the current before it reaches the solenoids 9 which will permit the springs 13 to project the cores 10 into engagement with the outer notches and thus lock the reflectors in their turned positions. Then the switch 23 can be opened so as to break the current and thus prevent waste of current.

When the reflectors are to be automatically turned by the turning movement of the steering mechanism, the lever 22 is placed in engagement with the contact of the conductor 25 so as to place the rheostat switch 26, which is associated with the steering mechanism, in connection with battery B, and then the actuation of this switch by the turning movement of the steering column will control the circuits to the solenoids 6 and 6', as before described.

When the reflectors are to be returned to their central positions while being held by the latch means, the lever 23 is momentarily closed so as to energize that set of solenoids which have their cores in projected positions so that the latch means will be rendered inactive by the current and the springs 3 permitted to return the parts to their normal or central positions.

As will be seen, this invention saves current by providing latch means for holding the reflectors in their turned positions and it also simplifies the connection between the solenoids and the reflectors.

By placing the lever 22 in the circuit of the steering column switch 26, the circuit can be broken during the day or whenever the steering column switch is to be rendered inactive.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with the headlamps of a vehicle, a reflector pivoted in the same so that it can move about its vertical axis, magnetic means for turning the reflector in either direction from a central position, said means including spaced diverging solenoids, arms pivoted to the cores of said solenoids and connected to the headlamps, an arcuate shaped plate connecting said arms, having spaced notches in its inner edge, circuits for the magnetic means, a hand operated switch for controlling the circuits, an automatic switch for controlling the circuits associated with the steering mechanism of the vehicle, a hand operated switch for rendering the automatic switch inactive and latch means associated with the magnetic means for holding the reflector in either its central or turned positions, said latch means being of the magnetic type and including a core having its outer end tapered for engagement in any one of the notches in the arcuate plate.

In testimony whereof I affix my signature.

ERNEST M. BAILEY.